US011118464B2

(12) United States Patent
Perez

(10) Patent No.: US 11,118,464 B2
(45) Date of Patent: Sep. 14, 2021

(54) AIRCRAFT GAS TURBINE ENGINE BLADE PITCH CHANGE MECHANISM

(71) Applicant: General Electric Company, Schenectady, NY (US)

(72) Inventor: Luis Mario Chan Perez, Queretaro (MX)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/157,256

(22) Filed: Oct. 11, 2018

(65) Prior Publication Data

US 2020/0116035 A1    Apr. 16, 2020

(51) Int. Cl.
*F01D 7/00* (2006.01)
*B64C 11/38* (2006.01)
*F04D 29/32* (2006.01)

(52) U.S. Cl.
CPC ................ *F01D 7/00* (2013.01); *B64C 11/38* (2013.01); *F04D 29/326* (2013.01);
(Continued)

(58) Field of Classification Search
CPC . F01L 1/3442; F01L 2001/3443; B64C 11/38; F01D 7/00; F15B 15/12; F04D 29/323; F04D 29/326
See application file for complete search history.

(56) References Cited

U.S. PATENT DOCUMENTS

| 156,648 A | 11/1874 | Peck |
|---|---|---|
| 2,023,785 A | 12/1935 | Hoover |

(Continued)

FOREIGN PATENT DOCUMENTS

| CN | 106050737 | 10/2016 |
|---|---|---|
| CN | 107084153 | 8/2017 |

(Continued)

OTHER PUBLICATIONS

China National Intellectual Property Administration, "First Office Action," issued in connection with Chinese patent application No. 201910958778.6, dated Oct. 10, 2020, 9 pages.

*Primary Examiner* — David Hamaoui
*Assistant Examiner* — Michael K. Reitz
(74) *Attorney, Agent, or Firm* — Hanley, Flight and Zimmerman, LLC

(57) ABSTRACT

Hydraulic pitch actuation mechanism includes vaned rotor within timing chamber surrounded by annular timing chamber wall within fan hub and variable area and volume retarding and advancing chambers within timing chamber. Timing pocket walls extend inwardly from timing chamber wall and interdigitated with timing vanes extending outwardly from vane shaft of vaned rotor. Hydraulic retarding and advancing fluid passages extend through fan drive shaft and through the fan hub to the retarding and advancing chambers respectively. Fluid passages include annular axially spaced apart retarding and advancing passage discharge sections, annular and axially spaced apart retarding and advancing passage entry sections spaced apart from and aft of retarding and advancing passage discharge sections respectively. Retarding and advancing connecting passage sections extend through fan drive shaft and fluidly connect retarding and advancing passage entry sections to retarding and advancing passage discharge sections. Hub passages through fan hub connect passage discharge sections to chambers.

19 Claims, 17 Drawing Sheets

(52) U.S. Cl.
CPC .... *F05D 2220/32* (2013.01); *F05D 2220/323* (2013.01); *F05D 2230/60* (2013.01); *F05D 2240/24* (2013.01); *F05D 2240/30* (2013.01); *F05D 2260/74* (2013.01); *F05D 2260/76* (2013.01)

(56) References Cited

U.S. PATENT DOCUMENTS

| | | |
|---|---|---|
| 2,184,143 A | 12/1939 | Hoover |
| RE22,034 E | 2/1942 | Hoover |
| 2,296,288 A | 9/1942 | Martin et al. |
| 2,462,932 A | 3/1949 | Anderson |
| 2,954,830 A | 10/1960 | Gehres |
| 3,156,301 A | 11/1964 | Biermann |
| 3,664,763 A | 5/1972 | Chilman |
| 5,186,608 A | 2/1993 | Bagge |
| 5,470,204 A | 11/1995 | Schäfer et al. |
| 6,981,844 B2 | 1/2006 | Perkinson et al. |
| 7,165,950 B2 | 1/2007 | Fenny et al. |
| 8,075,270 B2 | 12/2011 | Violette et al. |
| 8,376,269 B2 | 2/2013 | Jalaguier |
| 8,726,787 B2 | 5/2014 | Glynn et al. |
| 8,967,524 B2 | 3/2015 | Leclercq et al. |
| 9,169,783 B2 | 10/2015 | Kleckler |
| 2009/0151671 A1 | 6/2009 | Kobaishi |
| 2010/0129214 A1 | 5/2010 | Wilson et al. |
| 2016/0207609 A1 | 7/2016 | Belmonte et al. |
| 2017/0122119 A1 | 5/2017 | Niergarth et al. |
| 2017/0234324 A1 | 8/2017 | Niergarth et al. |

FOREIGN PATENT DOCUMENTS

| | | |
|---|---|---|
| JP | 2001265433 | 9/2001 |
| WO | 2016207522 | 12/2016 |

# AIRCRAFT GAS TURBINE ENGINE BLADE PITCH CHANGE MECHANISM

BACKGROUND OF THE INVENTION

Field of the Invention

The invention relates to aircraft gas turbine engines with variable pitch fan blades and, more particularly, to a hydraulic mechanism to vary the pitch of the fan blades or propellers.

Description of Related Art

It is known in the aircraft gas turbine engine field to provide variable pitch fan blades and propellers and mechanisms to vary the pitch of blades or propellers. The engines may be ducted or unducted. Variable pitch fan blades increase the overall performance of the engine by setting the optimal angle of the blade for each flight condition. It is known to use a hydraulic mechanism to vary the pitch of the fan blades or propellers. One type of such a mechanism is vane type. It is highly desirable to have a light-weight, simple, effective, and reliable variable pitch fan blade system and mechanism to vary the pitch of the fan blades.

SUMMARY OF THE INVENTION

A hydraulic pitch actuation mechanism includes a rotatable vaned rotor within a timing chamber surrounded by an annular timing chamber wall and centered within a fan hub, variable area and volume retarding and advancing chambers within the timing chamber, timing pocket walls extending radially inwardly from the annular timing chamber wall and interdigitated with timing vanes extending radially outwardly from a vane shaft of the vaned rotor, and hydraulic retarding and advancing fluid passages extending through a fan drive shaft and through the fan hub to the retarding and advancing chambers respectively.

The retarding and advancing fluid passages may include annular and axially spaced apart retarding and advancing passage discharge sections respectively, annular and axially spaced apart retarding and advancing passage entry sections respectively, and the retarding and advancing passage entry sections axially spaced apart from and aft of the retarding and advancing passage discharge sections respectively. Retarding and advancing connecting passage sections extending through the fan drive shaft may fluidly connect the retarding and advancing passage entry sections to the retarding and advancing passage discharge sections respectively.

Retarding and advancing hub passages may extend through the fan hub and fluidly connect the retarding and advancing discharge sections to the retarding and advancing chambers respectively.

The retarding and advancing passage discharge sections may include annular axially spaced apart retarding and advancing discharge grooves respectively extending into the fan drive shaft and covered by an aft end of the fan hub. The retarding and advancing passage entry sections may include annular axially spaced apart retarding and advancing entry grooves respectively extending into the fan drive shaft and covered by a shaft bearing support rotatably supporting the fan drive shaft.

Retarding and advancing fluid feed passages may extend radially through the bearing support to the retarding and advancing passage entry sections. Retarding and advancing oil lines may fluidly connect the retarding and advancing fluid feed passages to retarding and advancing valves for draining and filling retarding and advancing oil flow in the retarding and advancing chambers respectively. A single solenoid may be operably connected to the retarding and advancing valves.

An aircraft turbofan gas turbine engine may include a variable pitch fan including a plurality of variable pitch fan blades rotatably mounted in and extending radially outwardly from a fan hub, each of the fan blades being pivotable or rotatable about a pitch axis perpendicular or normal to an engine centerline axis, a hydraulic pitch actuation mechanism including a rotatable vaned rotor within a timing chamber surrounded by an annular timing chamber wall and centered within the fan hub, variable area and volume retarding and advancing chambers within the timing chamber, timing pocket walls extending radially inwardly from the annular timing chamber wall and interdigitated with timing vanes extending radially outwardly from a vane shaft of the vaned rotor, the vane shaft operably connected to the fan blades for varying pitch angle of the fan blades, and hydraulic retarding and advancing fluid passages extending through a fan drive shaft and through the fan hub to the retarding and advancing chambers respectively.

Each of the fan blades may include a fan blade pin or shaft extending radially inwardly from an airfoil and centered and circumscribed about the pitch axis, the fan blade shaft extending through and rotatable within a blade mounting hole in an annular hub wall of the fan hub, a sprocket mounted and secured to and around the fan blade shaft inside the fan hub, and a crown or ring gear engaging each of the sprockets.

The timing pocket walls may be operable with the timing vanes for varying circumferential area and volume of the variable area and volume retarding and advancing chambers.

BRIEF DESCRIPTION OF THE DRAWINGS

The foregoing aspects and other features of the invention are explained in the following description taken in connection with the accompanying drawings where.

DETAILED DESCRIPTION OF THE INVENTION

Figure 1:
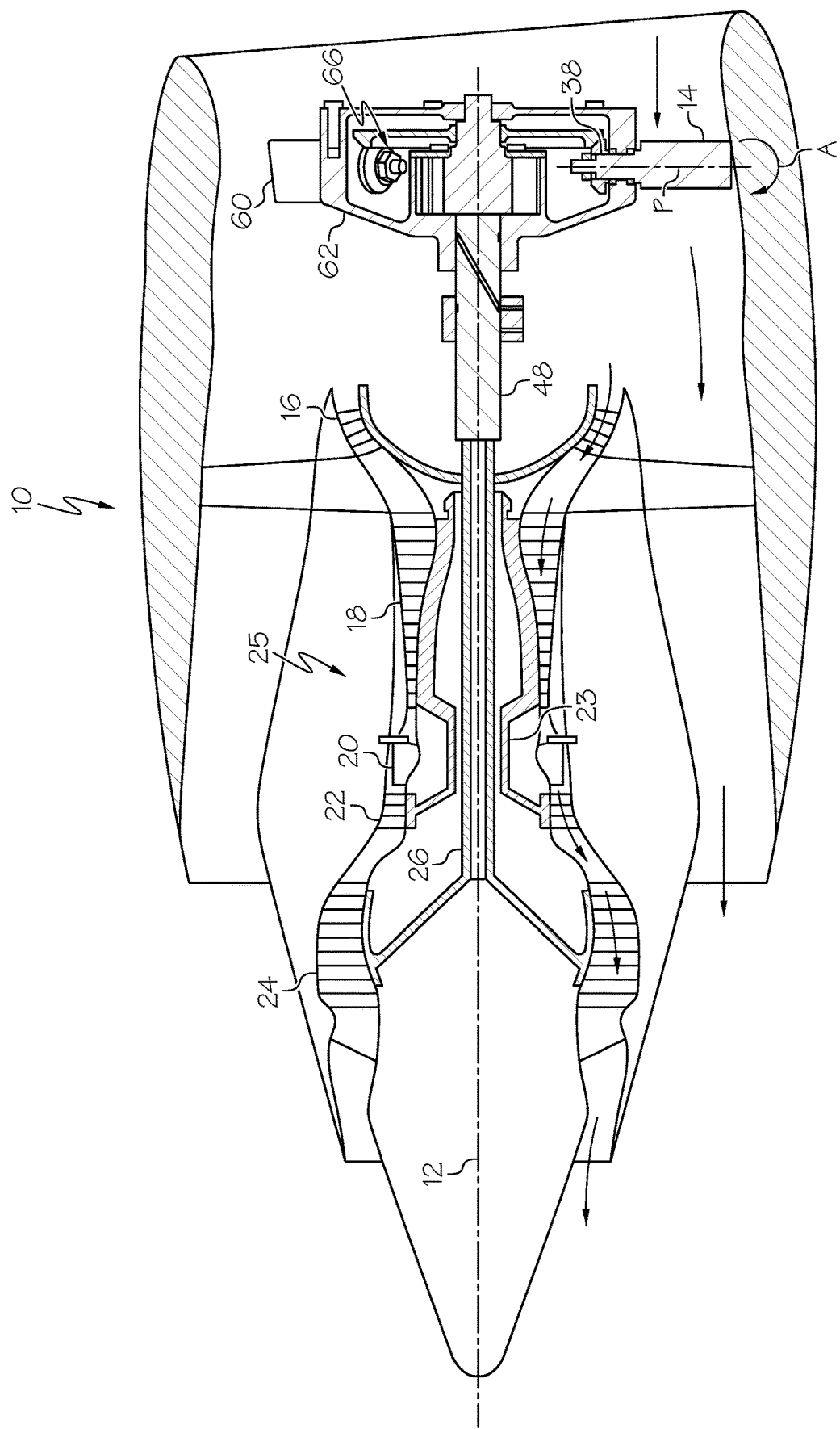
FIG. 1 is a longitudinal part sectional and part diagrammatical view illustration of an exemplary embodiment of an aircraft turbofan gas turbine engine, a variable pitch blade fan, and a pitch change mechanism therefore.

Illustrated in FIG. 1 is an exemplary aircraft turbofan gas turbine engine 10 circumscribed about an engine centerline axis 12 and suitably designed to be mounted to a wing or fuselage of an aircraft. The engine 10 includes, in downstream serial flow communication, a fan 14, a low pressure compressor or booster 16, a high pressure compressor 18, a combustor 20, a high pressure turbine (HPT) 22, and a low pressure turbine (LPT) 24. A core engine 25 includes the HPT or high pressure turbine 22 drivingly connected by a high pressure drive shaft 23 to the high pressure compressor 18 and the combustor 20. The LPT or low pressure turbine 24 is drivingly connected by a low pressure drive shaft 26 to both the fan 14 and the booster 16.

Figure 2:
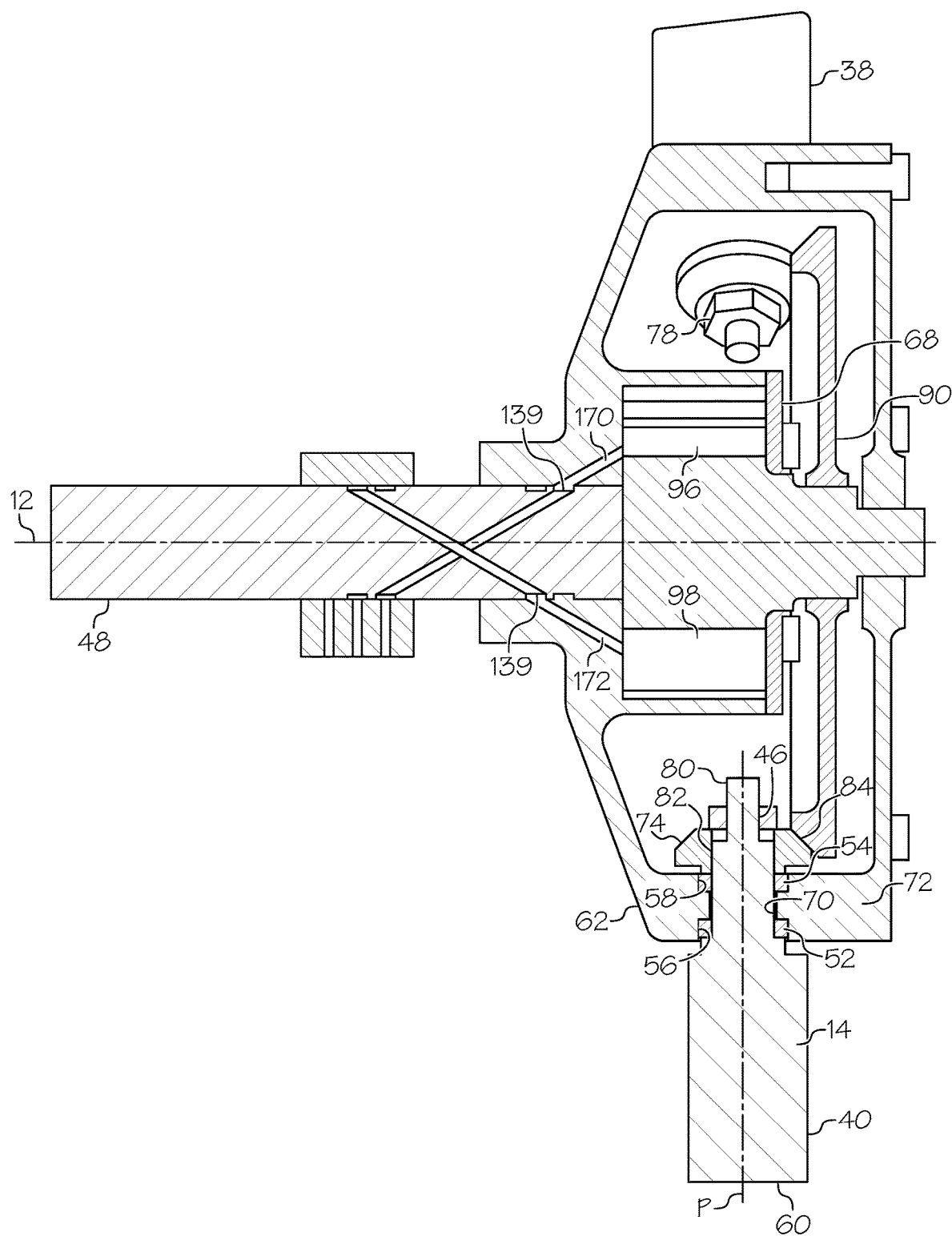
FIG. 2 is an enlarged sectional diagrammatical view illustration of a fan hub including the pitch change mechanism illustrated in FIG. 1.

The fan 14 includes a fan hub 62 rotatable about the engine centerline axis 12 by a fan drive shaft 48 connected to the low pressure drive shaft 26. The fan 14 is a variable pitch fan 38 having a plurality of variable pitch fan blades 60 rotatably mounted in and extending radially outwardly from the fan hub 62 as illustrated in FIGS. 1 and 2. Each fan blade 60 is pivotable or rotatable about a pitch axis P perpendicular or normal to the centerline axis 12. A hydraulic pitch actuation mechanism 66 is operable to vary the pitch angle A of the fan blades 60 in unison. Referring to FIGS. 1-2, each fan blade 60 includes a fan blade pin or shaft 46 extending radially inwardly from an airfoil 40 and is centered and circumscribed about the pitch axis P.

Referring to FIGS. 2, 5, 6, and 11, the fan blade shaft 46 extends through outer and inner thrust bearings 52, 54, set into outer and inner counterbores 56, 58 of a blade mounting hole 70 in an annular hub wall 72 of the fan hub 62. A sprocket 74 is mounted to and around the fan blade shaft 46 inside the fan hub 62. An at least partially threaded extension 80 of the blade shaft 46 extends through a sprocket hole 82 in an inner end 84 of the sprocket 74. A nut 78 threaded onto the at least partially threaded extension 80 secures the sprocket 74 to the blade shaft 46 and axially retains the blade shaft 46 within the blade mounting hole 70.

The fan blade shaft 46 and the sprocket 74 may include respective shaft and sprocket shoulders 85, 86 engaging the outer and inner thrust bearings 52, 54 respectively. The shaft and sprocket shoulders 85, 86 may have substantially equally wide shaft and sprocket shoulder diameters 87, 88 as more particularly illustrated in FIG. 11. A crown or ring gear 90 engages the sprockets 74 attached to the fan blade shaft 46 of each propeller or fan blade 60. The crown or ring gear 90 is attached to the vane shaft 102 that is attached to the low pressure drive shaft 26. Pitch of the blades is set by rotating clockwise and counter-clockwise the crown or ring gear 90 that engage the sprockets 74 using the hydraulic pitch actuation mechanism 66.

Figure 16:
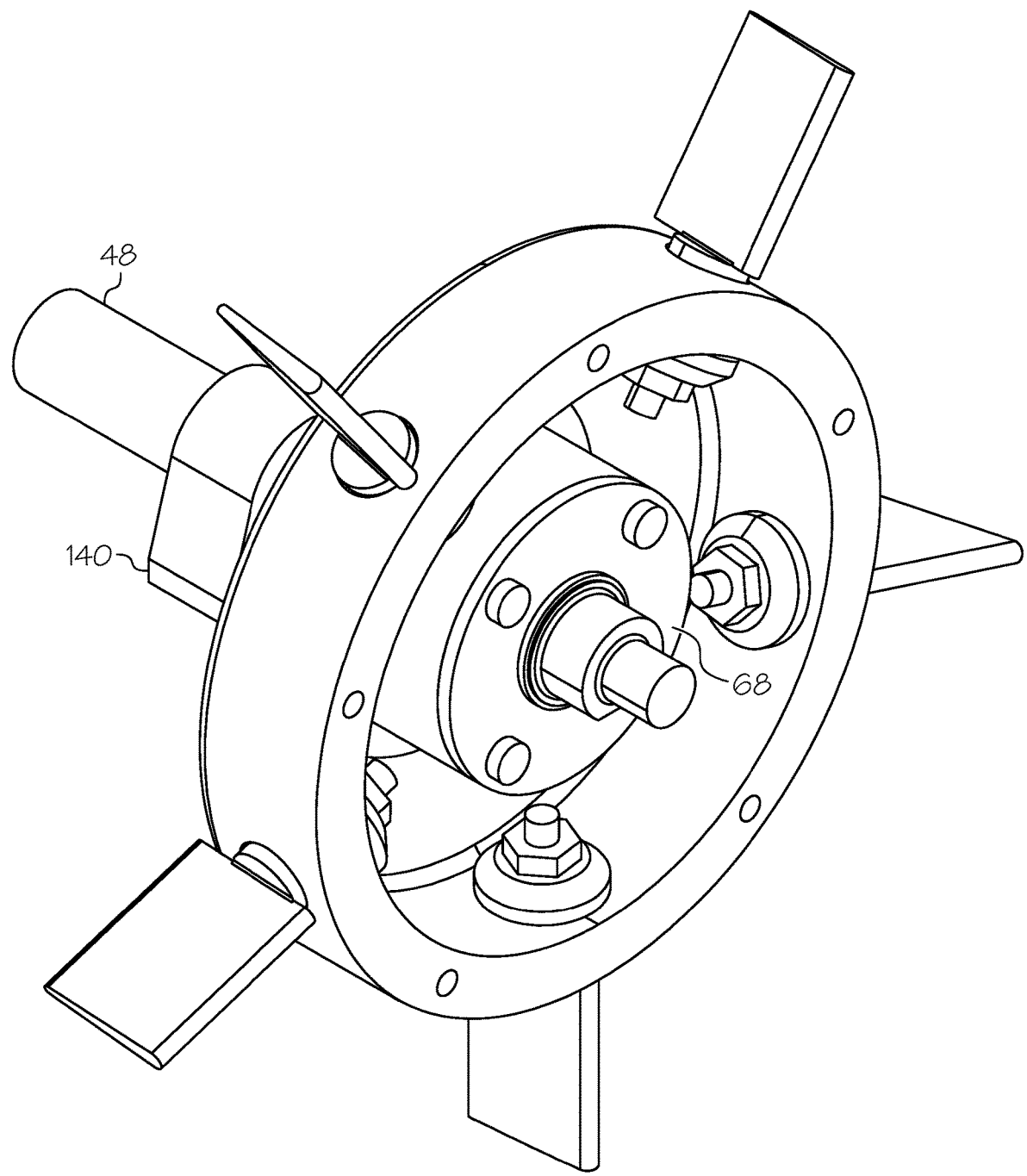
FIG. 16 is a forward looking aft diagrammatical perspective view illustration of inside the fan hub without the ring gear of the mechanism and cover of the fan hub illustrated in FIG. 2.
Figure 17:
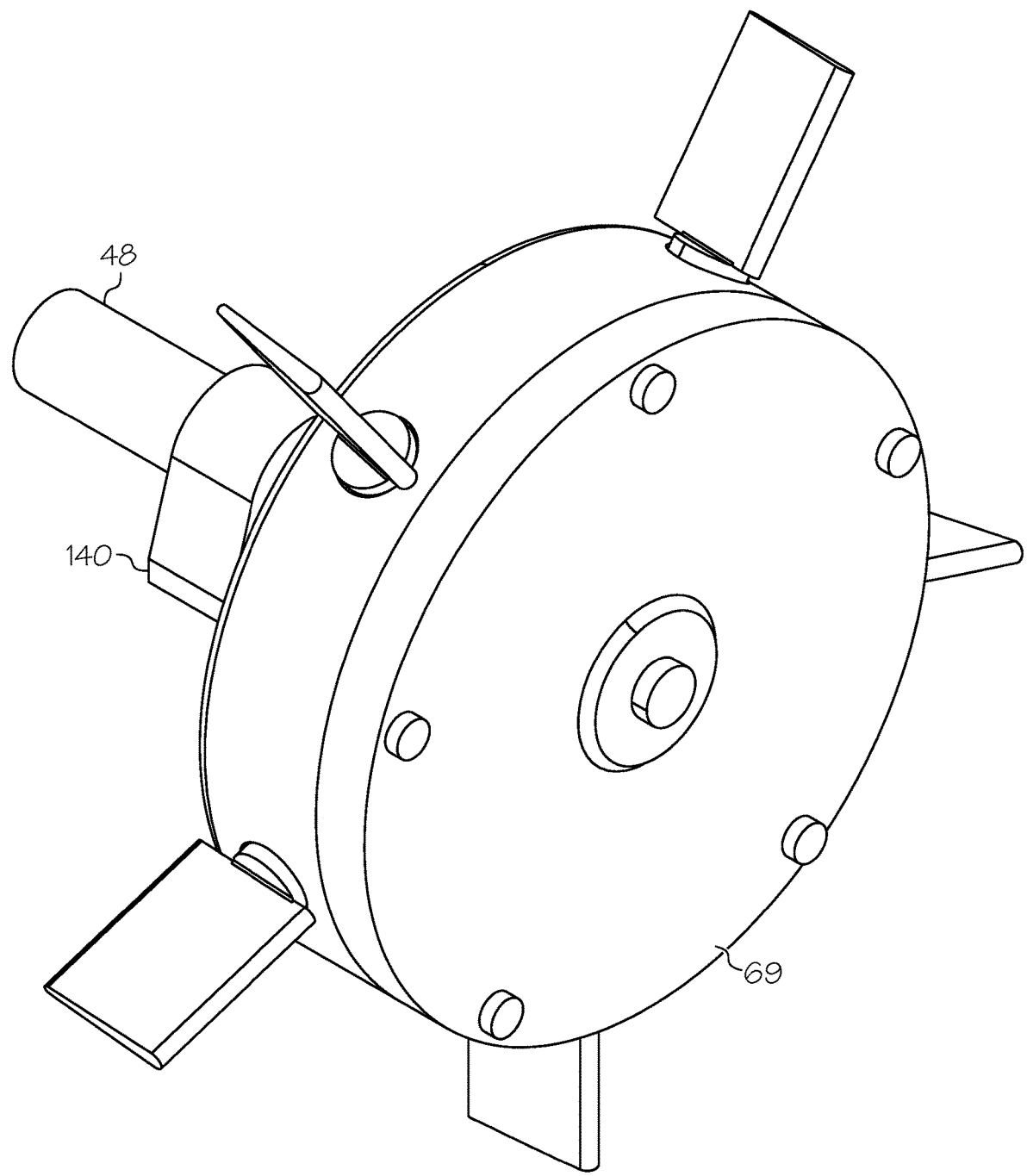
FIG. 17 is a forward looking aft diagrammatical perspective view illustration of inside the fan hub with the cover of the fan hub illustrated in FIG. 16.

Referring to FIGS. 2-6, the hydraulic pitch actuation mechanism 66 includes a rotatable vaned rotor 92 within a timing chamber 94 surrounded by an annular timing chamber wall 106 and centered within the fan hub 62. A timing chamber cap 68 covers the timing chamber 94 as illustrated in FIGS. 2 and 16. A fan hub cap 69 covers the hub 62 as illustrated in FIGS. 2 and 17. Rotatable timing vanes 100, four are illustrated herein, are fixed to and extend radially outwardly from a vane shaft 102 of the vaned rotor 92. Timing pocket walls 104, four are illustrated herein, extend radially inwardly from the annular timing chamber wall 106 and are interdigitated and cooperate with the timing vanes 100 to vary circumferential area 110 and volume 112 of variable area and volume retarding and advancing chambers 96, 98 therebetween. The timing pocket walls 104 and the retarding and advancing chambers 96, 98 are located within the timing chamber 94.

Oil or other hydraulic fluid is pumped in and out of the retarding and advancing chambers 96, 98 through circumferentially spaced apart retarding and advancing chamber ports 116, 118 in a base 119 of the timing chamber 94. The retarding and advancing chambers 96, 98 are illustrated as being on clockwise and counter-clockwise sides 114, 115 of each of the timing pocket walls 104 looking forward and looking aft with respect to the engine 10 and correspond to positive and negative change in pitch angle A (illustrated in FIG. 6) of the blades 60 from a predetermined 0 degree position (illustrated in FIG. 5).

Referring to FIGS. 3-4 and 7-10, oil or other hydraulic fluid is supplied to and drained from the retarding and advancing chambers 96, 98 through at least one pair of hydraulic retarding and advancing fluid passages 120, 122 respectively through the fan drive shaft 48 and fan hub 62. The retarding and advancing fluid passages 120, 122 include annular axially spaced apart retarding and advancing passage discharge sections 125, 127 which may include axially spaced apart annular retarding and advancing discharge grooves 126, 128. The retarding and advancing discharge grooves 126, 128 extend into the fan drive shaft 48 and are covered by an aft end 142 of the fan hub 62. The aft end 142 may be annular as illustrated herein.

The retarding and advancing fluid passages 120, 122 include annular axially spaced apart retarding and advancing passage entry sections 155, 157 which may include axially spaced apart annular retarding and advancing entry grooves 156, 158 respectively. The retarding and advancing passage entry sections 155, 157 are fluidly connected to the retarding and advancing passage discharge sections 125, 127 by retarding and advancing connecting passage sections 130, 132 respectively as indicated by grove holes 139. The retarding and advancing entry grooves 156, 158 extend into the fan drive shaft 48 and are covered by a fan drive shaft bearing support 140. The retarding and advancing connecting passage sections 130, 132 extend through the fan drive shaft 48, may be linear, and axially and circumferentially offset from each other. More than one retarding connecting passage section 130 and more than one advancing connecting passage section 132 may be used.

Figure 10:
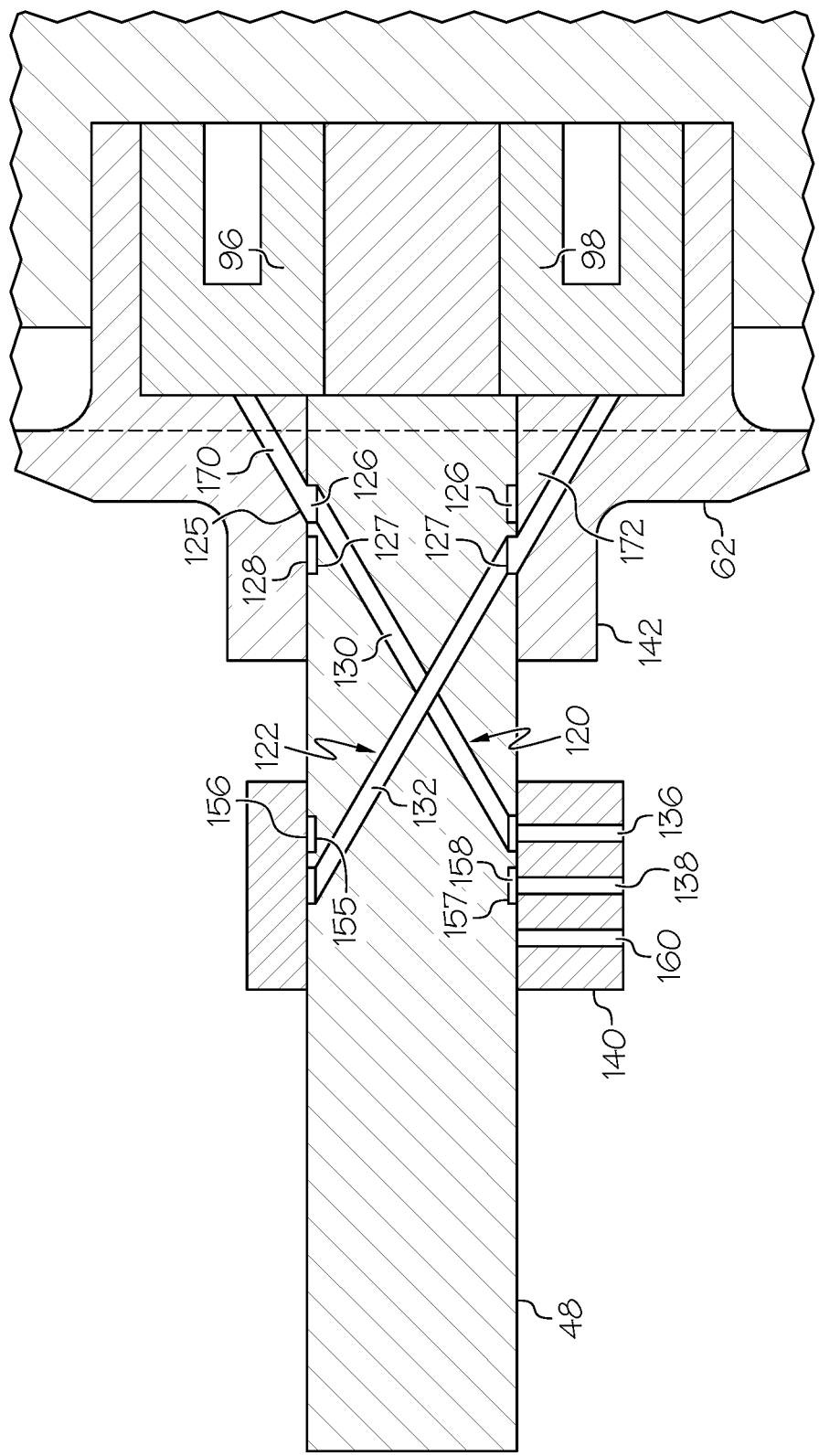
FIG. 10 is a sectional view illustration of oil passages in the shaft, bearing support, and hub illustrated in FIG. 7.
Figure 11:
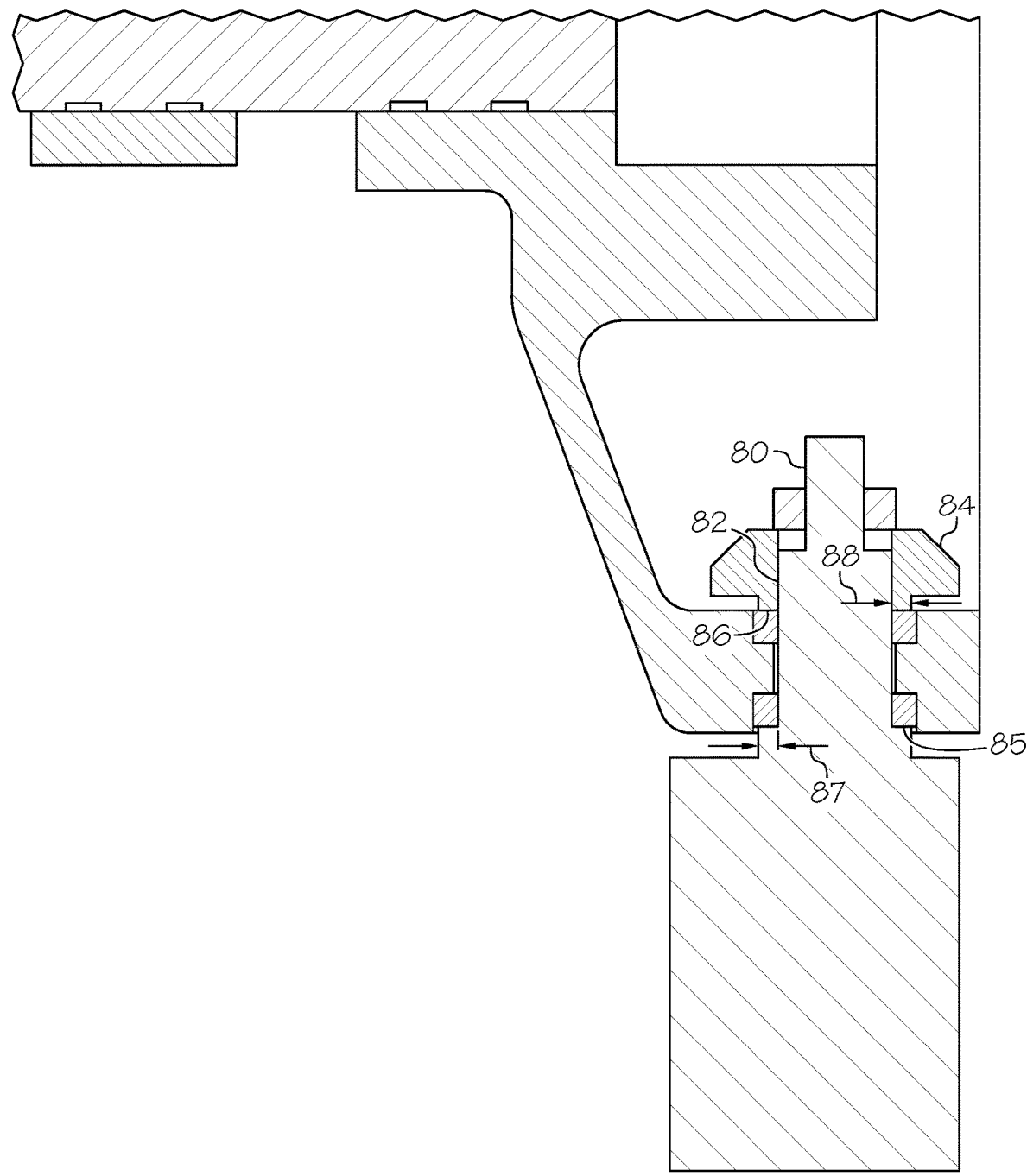
FIG. 11 is a sectional view illustration of a blade mounted to the hub illustrated in FIG. 9.

The retarding and advancing passage entry sections 155, 157 are axially spaced apart from and aft of the retarding and advancing passage discharge sections 125, 127 respectively. The retarding and advancing passage discharge sections 125, 127 are fluidly connected to the retarding and advancing chambers 96, 98 by retarding and advancing hub passages 170, 172 respectively through the fan hub 62 as illustrated in FIGS. 2 and 10. There may be one or more of the retarding and advancing hub passages 170, 172 for each of the retarding and advancing chambers 96, 98.

Referring to FIGS. 10 and 12-15, one or more oil feed passages 160 extending radially through the bearing support 140 to the fan drive shaft 48 may be used to lubricate the fan drive shaft 48. Retarding and advancing fluid feed passages 136, 138 extending radially through the bearing support 140 conduct the oil to the retarding and advancing circumferential discharge grooves 126, 128 of the retarding and advancing passage entry sections 155, 157 from retarding and advancing oil lines 144, 146 respectfully illustrated in FIGS. 13 and 15.

Figure 12:
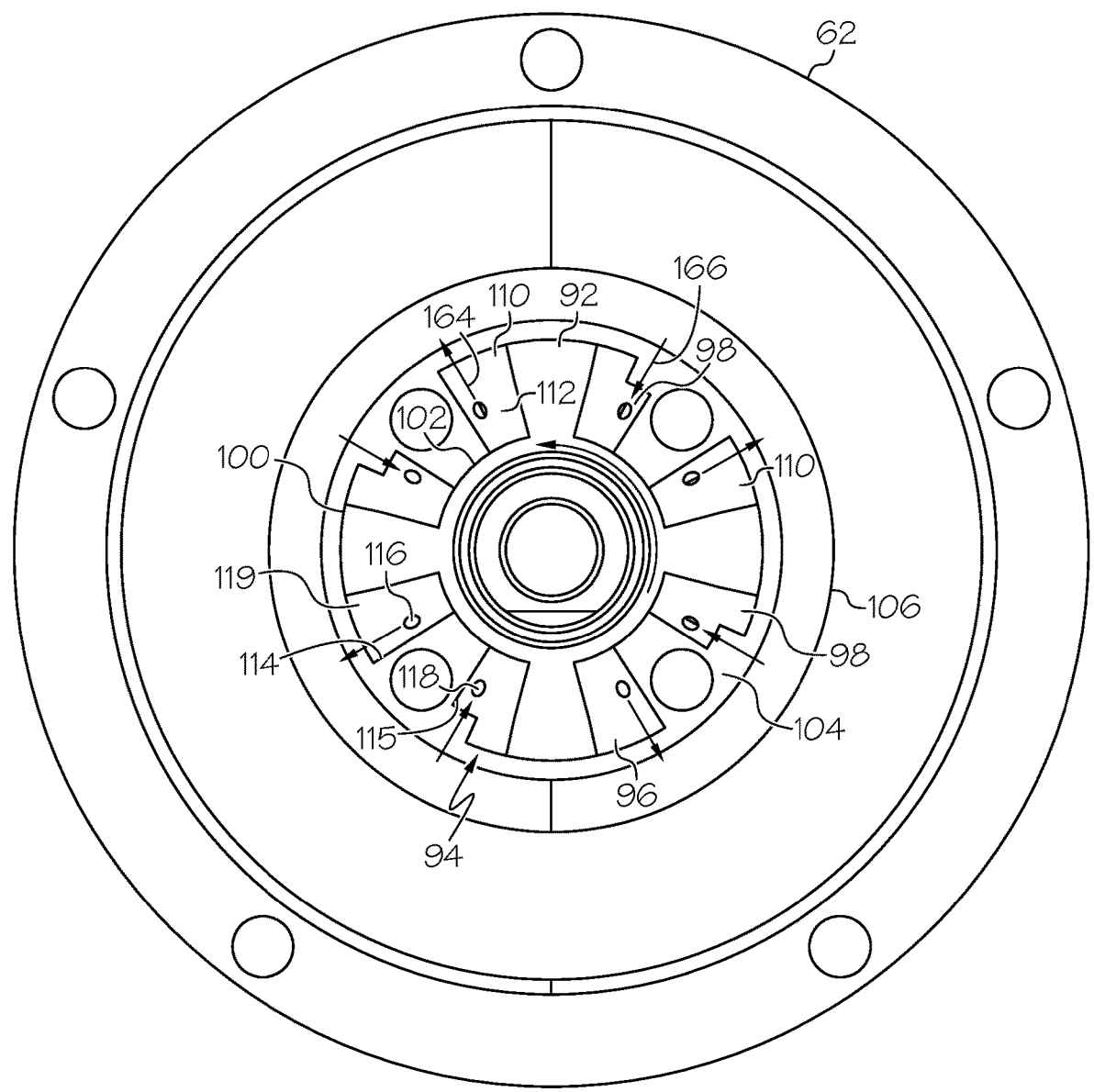
FIG. 12 is a forward looking aft diagrammatical sectional view illustration of oil flow in and out of the timing chamber for advancing timing of the mechanism inside the fan hub illustrated in FIG. 3.
Figure 13:
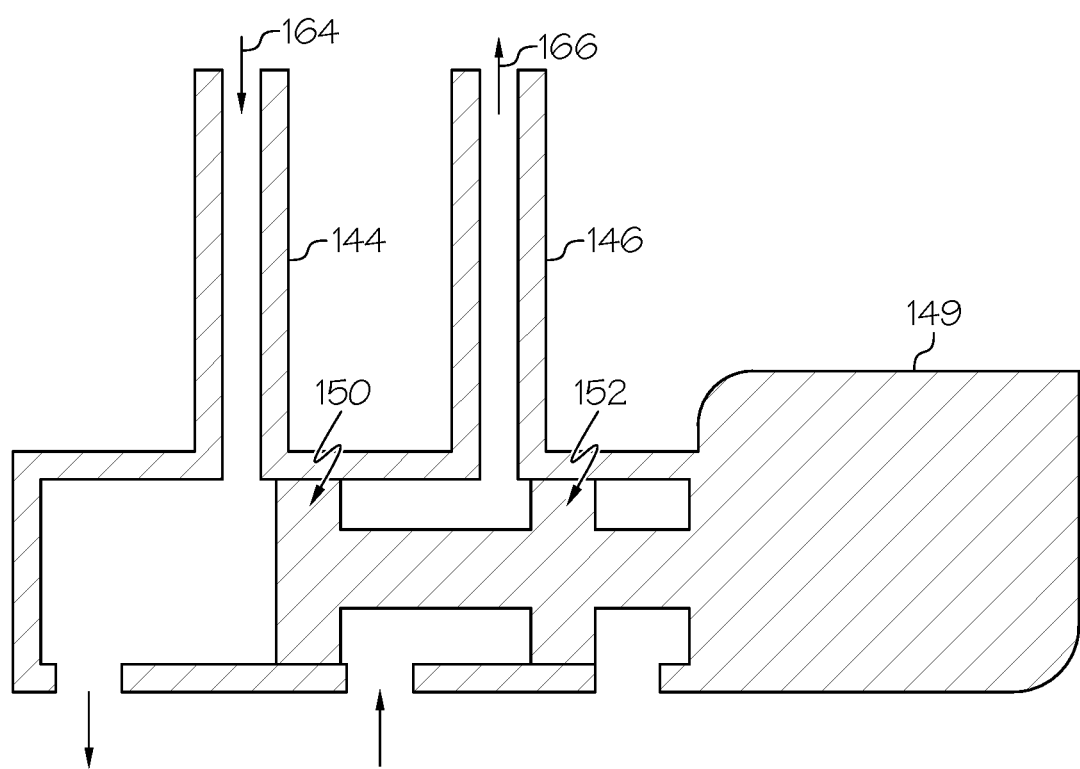
FIG. 13 is a diagrammatical sectional view illustration of oil flow in and out of a solenoid valve connected to the timing chamber illustrated in FIG. 12.
Figure 14:
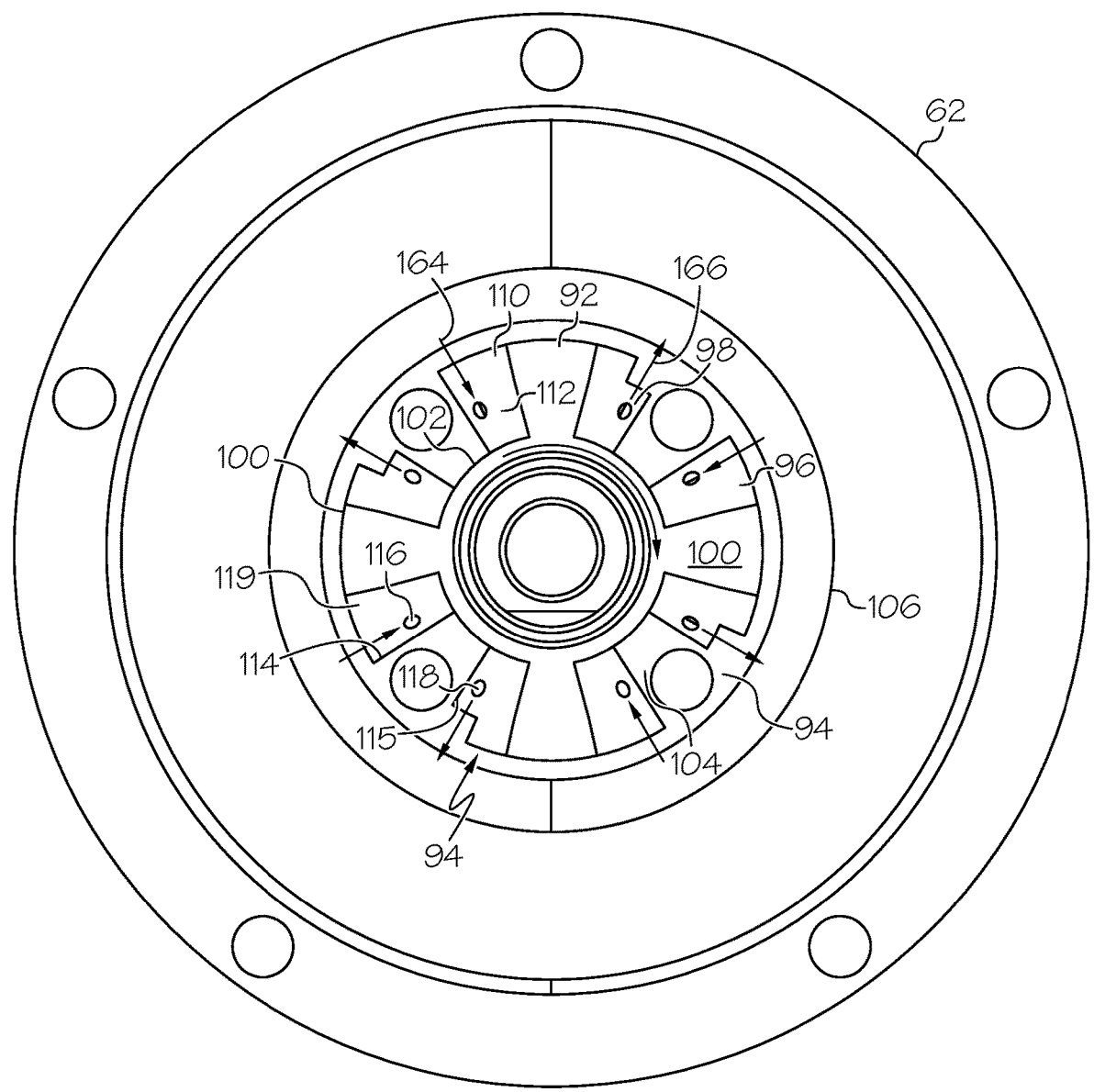
FIG. 14 is a forward looking aft diagrammatical sectional view illustration of oil flow in and out of the timing chamber for retarding timing of the mechanism inside the fan hub illustrated in FIG. 3.
Figure 15:
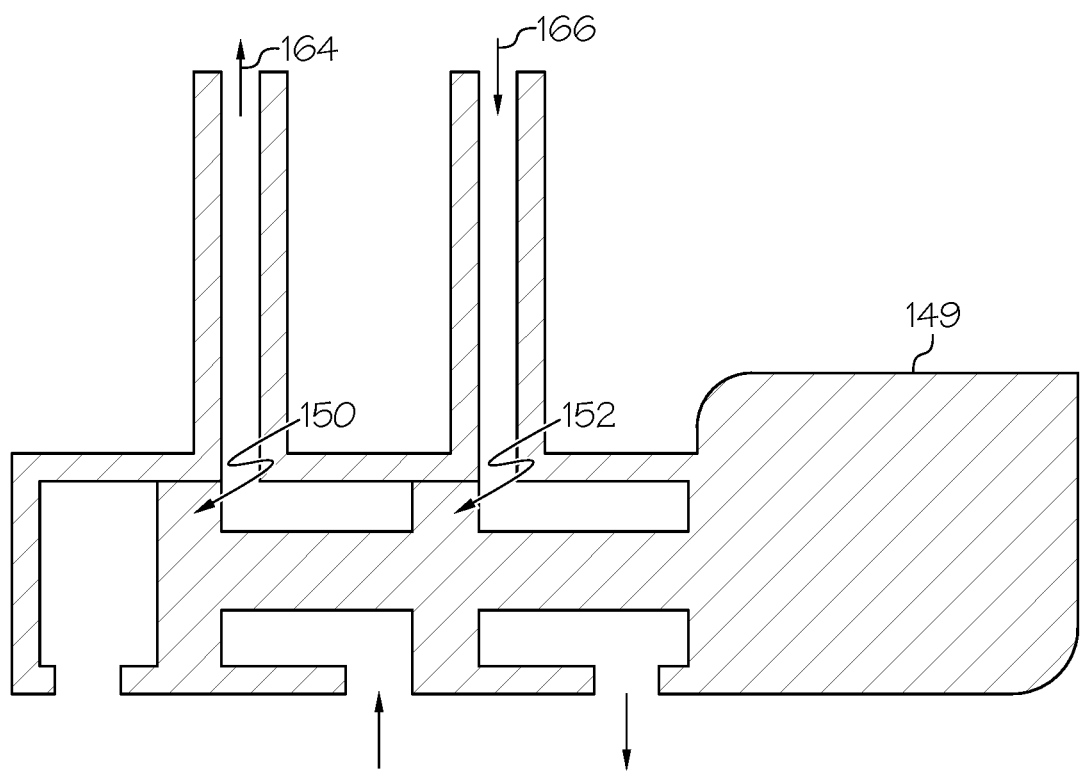
FIG. 15 is a diagrammatical sectional view illustration of oil flow in and out of a solenoid valve connected to the timing chamber illustrated in FIG. 14.

The retarding and advancing oil lines 144, 146 are fluidly connected to solenoid 149 operated retarding and advancing valves 150, 152 used to drain and fill retarding and advancing oil, indicated by retarding oil flow 164 and advancing oil flow 166, in the retarding and advancing chambers 96, 98 respectively as illustrated in FIGS. 12 and 13 to vary the pitch of the blades 60. The retarding and advancing valves 150, 152 are also used to fill and drain retarding and advancing oil, indicated by retarding oil flow 164 and advancing oil flow 166, in the retarding and advancing chambers 96, 98 respectively as illustrated in FIGS. 14 and 15 to vary the pitch of the blades 60. A single solenoid 149 may be operably connected to the retarding and advancing valves 150, 152 as illustrated herein.

Figure 3:
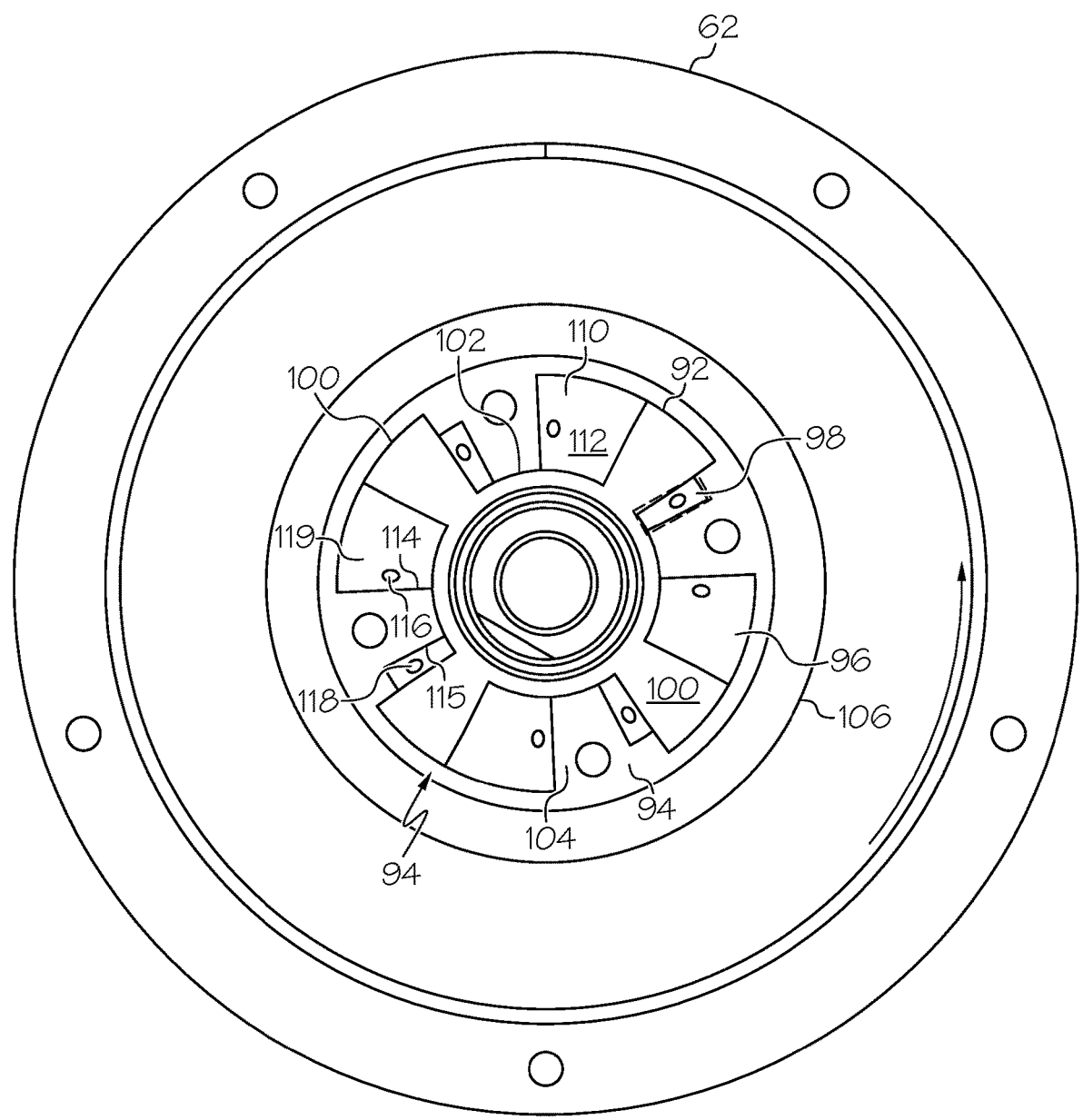
FIG. 3 is a forward looking aft diagrammatical sectional view illustration of vanes and timing chamber inside the fan hub illustrated in FIG. 2.
Figure 4:
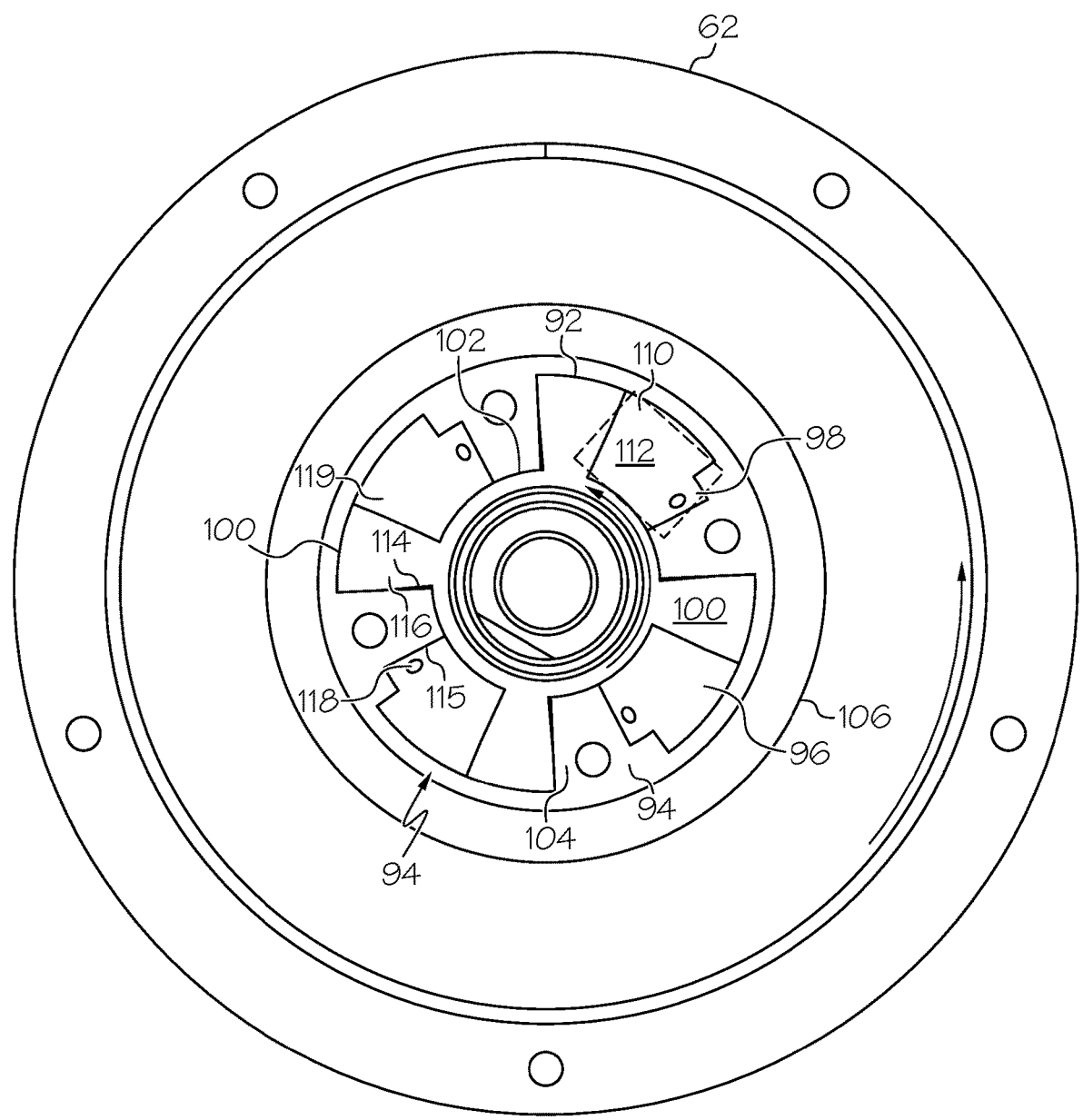
FIG. 4 is a forward looking aft diagrammatical sectional view illustration of timing advance using the vanes and timing chamber inside the fan hub illustrated in FIG. 3.
Figure 5:
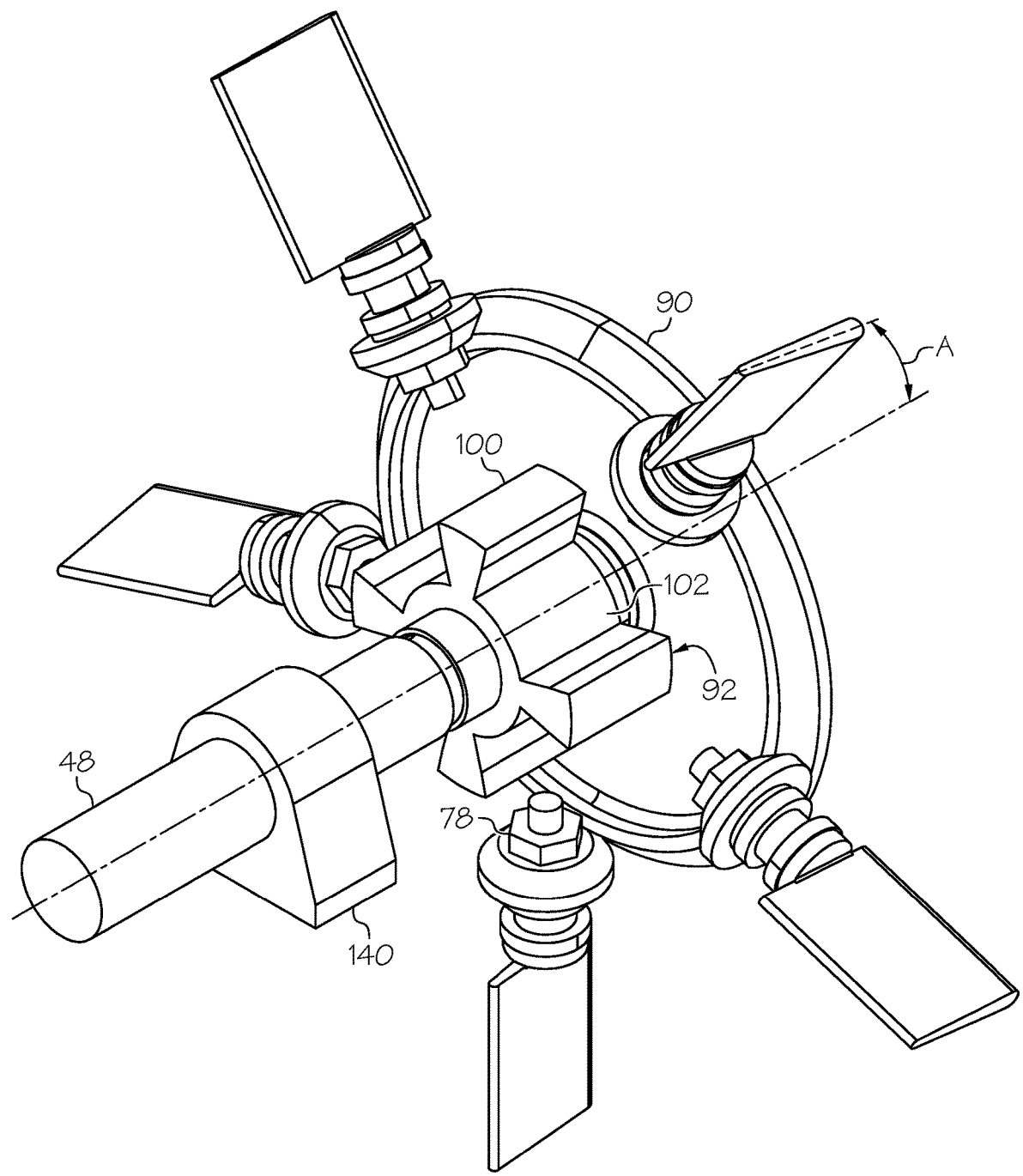
FIG. 5 is a diagrammatical perspective view illustration inside the pitch change mechanism illustrated in FIG. 2 with the blades at about 0 degrees pitch.
Figure 6:
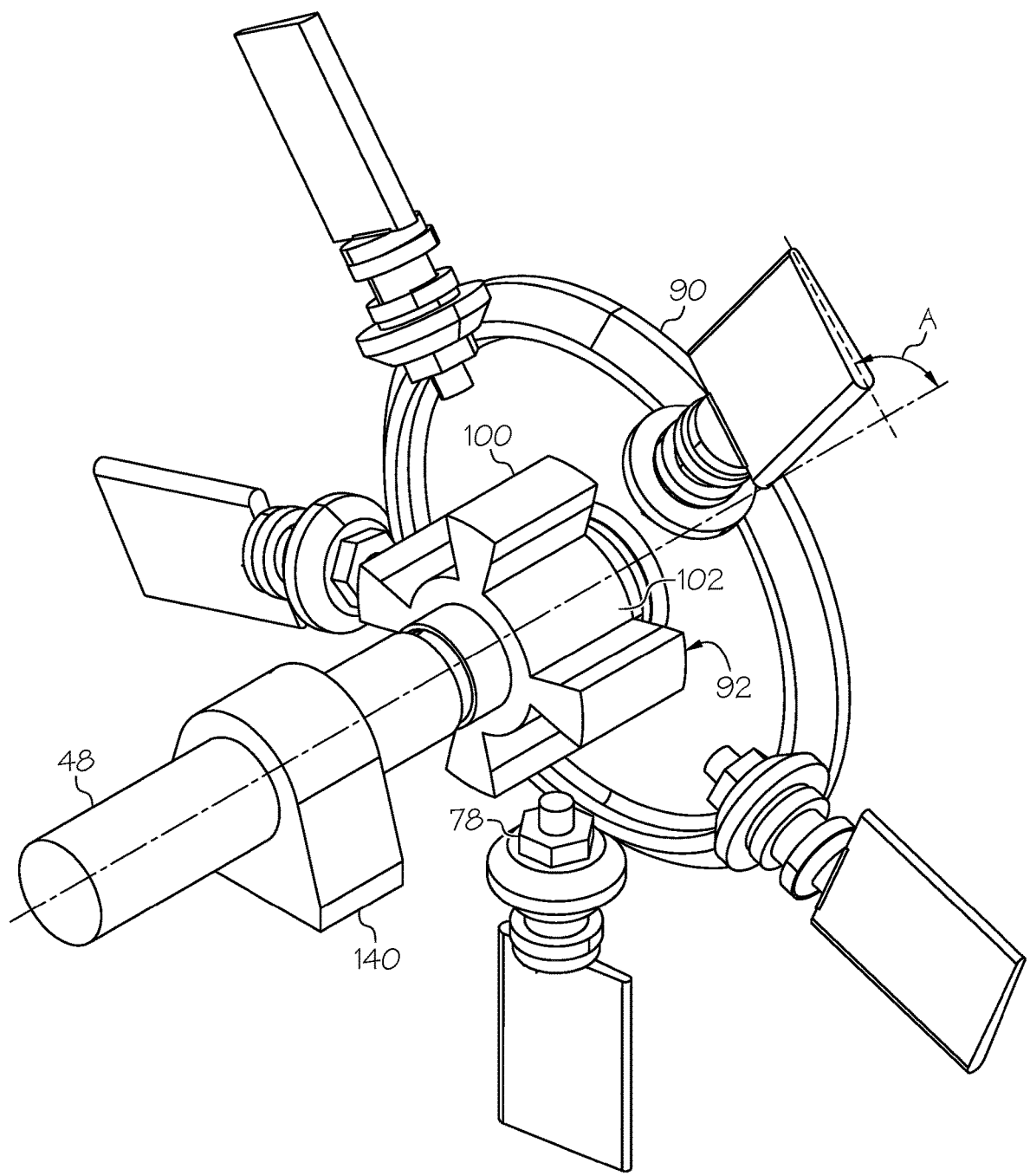
FIG. 6 is a diagrammatical perspective view illustration inside the pitch change mechanism illustrated in FIG. 2 with the blades at about 90 degrees pitch.
Figure 7:
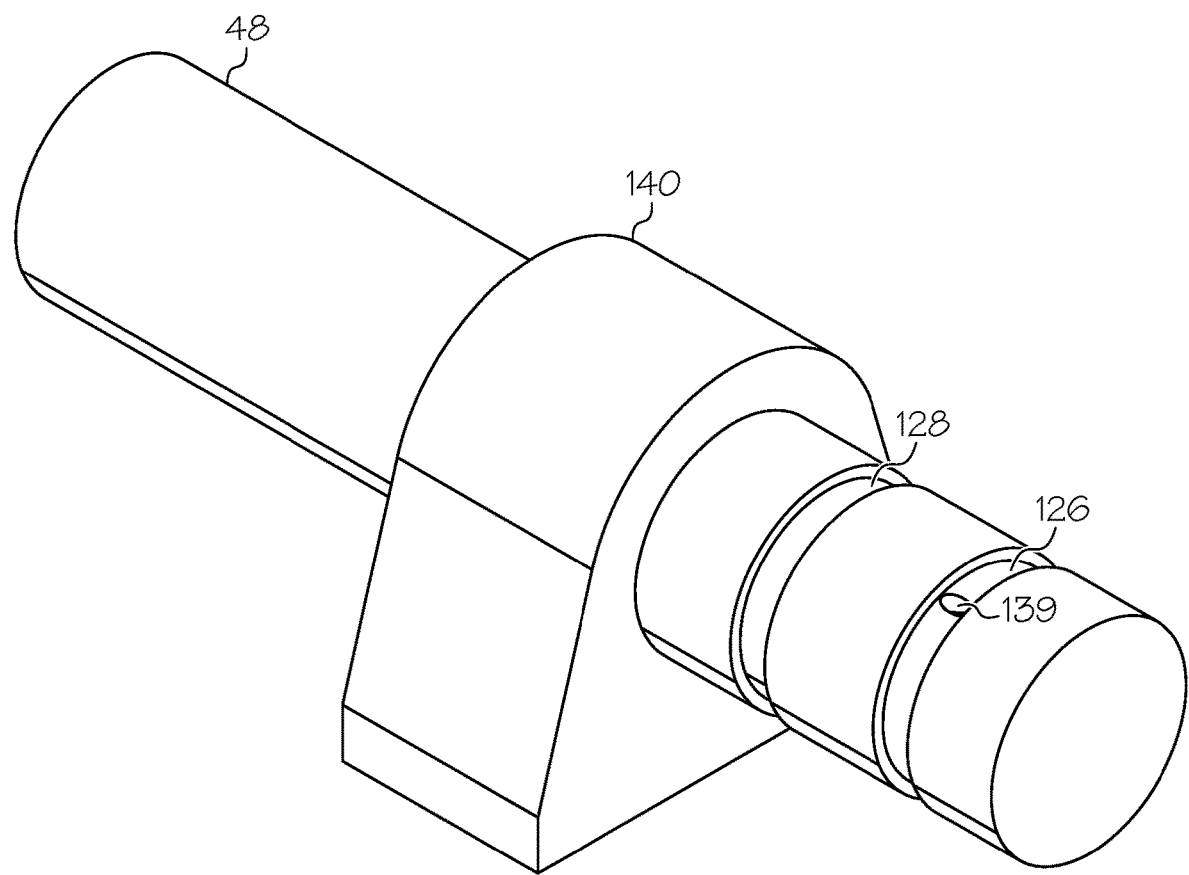
FIG. 7 is a perspective view illustration of the shaft journaled in a bearing support aft of the hub illustrated in FIG. 2.
Figure 8:
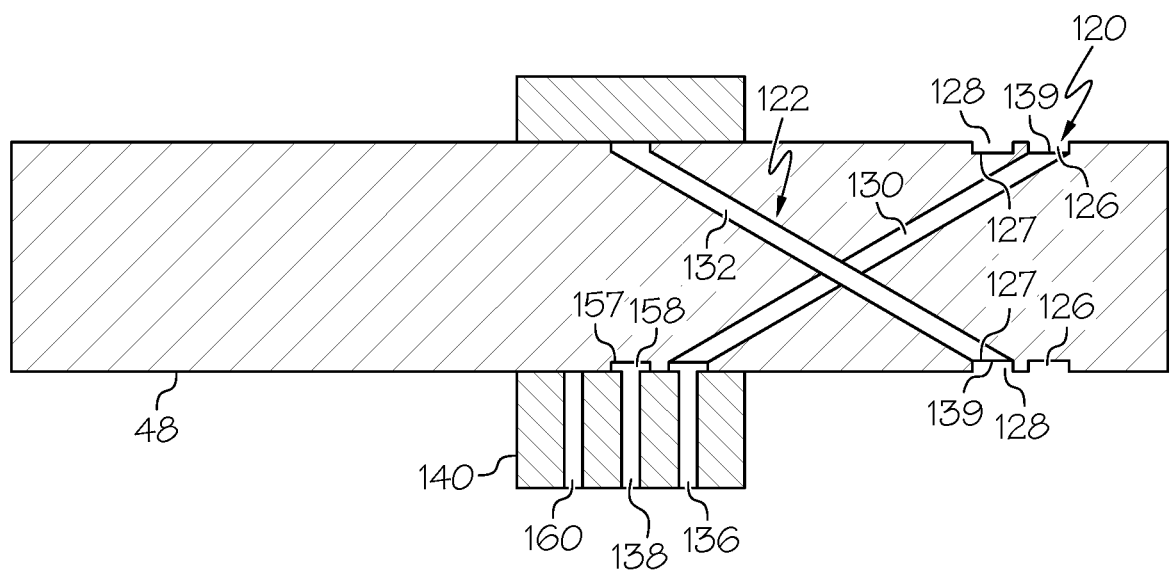
FIG. 8 is a sectional view illustration of oil passages in the shaft and bearing support illustrated in FIG. 7.
Figure 9:
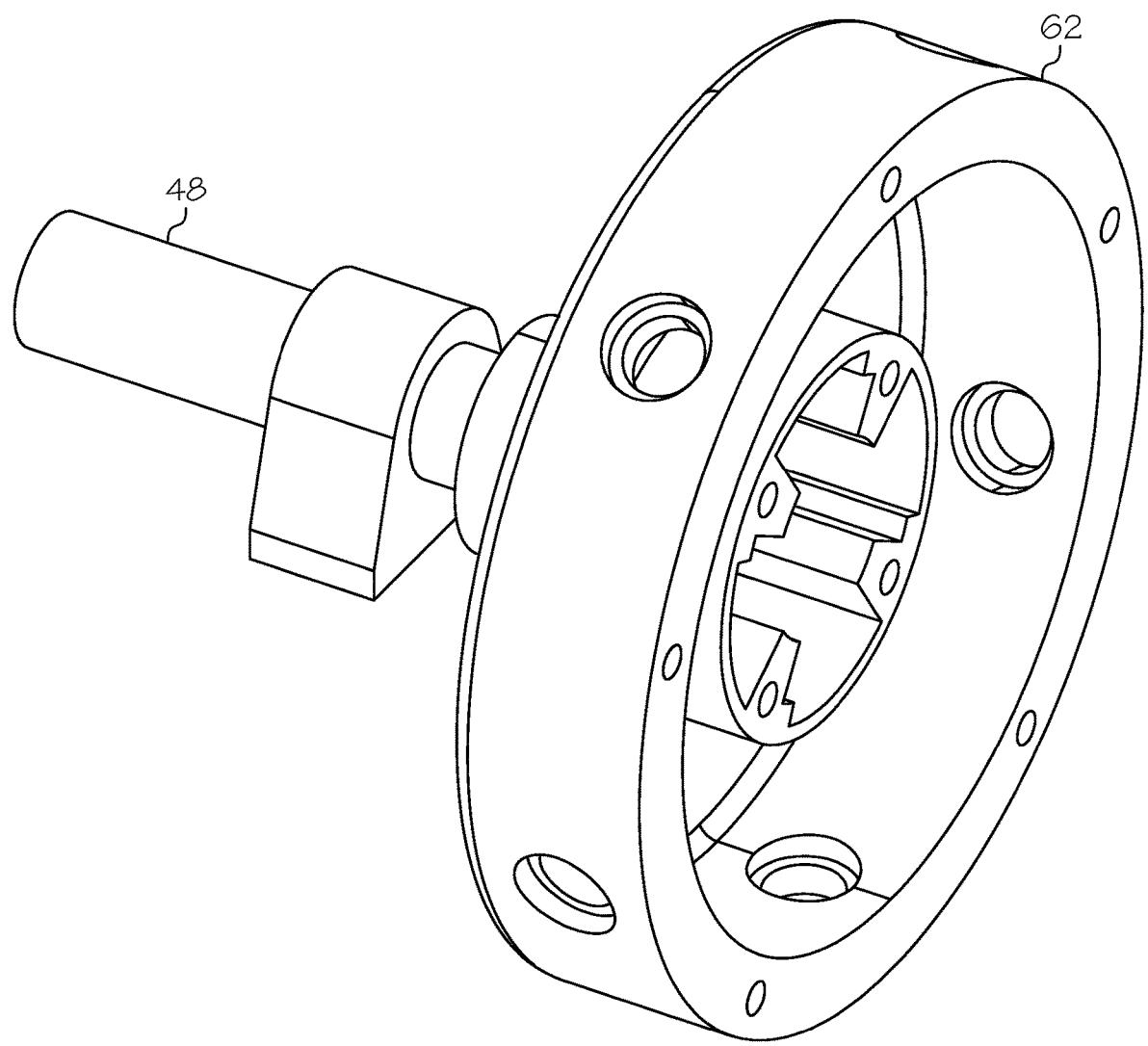
FIG. 9 is a forward looking aft diagrammatical perspective view illustration of the timing chamber inside the fan hub illustrated in FIG. 9.

FIG. 3 illustrates the retarding chambers 96 being filled with oil and the advancing chambers 98 being almost fully drained corresponding to the blades 60 being fully positively pitched as illustrated in FIG. 5.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

What is claimed:

1. A hydraulic pitch actuation mechanism comprising:
    a rotatable vaned rotor within a timing chamber surrounded by an annular timing chamber wall and centered within a fan hub,
    variable area and volume retarding and advancing chambers within the timing chamber,
    timing pocket walls extending radially inwardly from the annular timing chamber wall and interdigitated with timing vanes extending radially outwardly from a vane shaft of the rotatable vaned rotor, and
    hydraulic retarding and advancing fluid passages extending through a fan drive shaft and through the fan hub to the retarding and advancing chambers respectively,
    wherein the hydraulic retarding and advancing fluid passages include:
        annular and axially spaced apart retarding and advancing passage discharge sections respectively; and
        annular and axially spaced apart retarding and advancing passage entry sections respectively, and
    wherein the retarding and advancing passage entry sections are axially spaced apart from and aft of the retarding and advancing passage discharge sections respectively.

2. The hydraulic pitch actuation mechanism as claimed in claim 1, further comprising retarding and advancing connecting passage sections extending through the fan drive shaft and fluidly connecting the retarding and advancing passage entry sections to the retarding and advancing passage discharge sections respectively.

3. The hydraulic pitch actuation mechanism as claimed in claim 2, further comprising retarding and advancing hub passages extending through the fan hub and fluidly connecting the retarding and advancing passage discharge sections to the retarding and advancing chambers respectively.

4. The hydraulic pitch actuation mechanism as claimed in claim 3, further comprising the retarding and advancing passage discharge sections including annular axially spaced apart retarding and advancing discharge grooves respectively extending into the fan drive shaft and covered by an aft end of the fan hub.

5. The hydraulic pitch actuation mechanism as claimed in claim 4, further comprising the retarding and advancing passage entry sections including annular axially spaced apart retarding and advancing entry grooves respectively extending into the fan drive shaft and covered by a shaft bearing support rotatably supporting the fan drive shaft.

6. The hydraulic pitch actuation mechanism as claimed in claim 5, further comprising:
    retarding and advancing fluid feed passages extending radially through the shaft bearing support to the retarding and advancing passage entry sections,
    one or more oil feed passages extending through the shaft bearing support to the fan drive shaft for lubricating the fan drive shaft, and
    retarding and advancing oil lines fluidly connecting the retarding and advancing fluid feed passages to retarding and advancing valves for draining and filling retarding and advancing oil flow in the retarding and advancing chambers respectively.

7. The hydraulic pitch actuation mechanism as claimed in claim 3, further comprising:
    a shaft bearing support rotatably supporting the fan drive shaft,
    retarding and advancing fluid feed passages extending radially through the shaft bearing support to the retarding and advancing passage entry sections,
    one or more oil feed passages extending through the shaft bearing support to the fan drive shaft for lubricating the fan drive shaft, and
    retarding and advancing oil lines fluidly connecting the retarding and advancing fluid feed passages to retarding and advancing valves for draining and filling retarding and advancing oil flow in the retarding and advancing chambers respectively.

8. The hydraulic pitch actuation mechanism as claimed in claim 7, further comprising a single solenoid operably connected to the retarding and advancing valves.

9. An aircraft turbofan gas turbine engine comprising:
a variable pitch fan including a plurality of variable pitch fan blades rotatably mounted in and extending radially outwardly from a fan hub,
each of the variable pitch fan blades being pivotable or rotatable about a pitch axis perpendicular or normal to an engine centerline axis,
a hydraulic pitch actuation mechanism including a rotatable vaned rotor within a timing chamber surrounded by an annular timing chamber wall and centered within the fan hub,
variable area and volume retarding and advancing chambers within the timing chamber,
timing pocket walls extending radially inwardly from the annular timing chamber wall and interdigitated with timing vanes extending radially outwardly from a vane shaft of the rotatable vaned rotor,
the vane shaft operably connected to the variable pitch fan blades for varying pitch angle of the variable pitch fan blades, and
hydraulic retarding and advancing fluid passages extending through a fan drive shaft and through the fan hub to the retarding and advancing chambers respectively,
wherein the hydraulic retarding and advancing fluid passages include:
annular and axially spaced apart retarding and advancing passage discharge sections respectively; and
annular and axially spaced apart retarding and advancing passage entry sections respectively, and
wherein the retarding and advancing passage entry sections are axially spaced apart from and aft of the retarding and advancing passage discharge sections respectively and fluidly connected by retarding and advancing connecting passage sections, respectively, extending through the fan drive shaft.

10. The aircraft turbofan gas turbine engine as claimed in claim 9, further comprising retarding and advancing hub passages extending through the fan hub and fluidly connecting the retarding and advancing passage discharge sections to the retarding and advancing chambers respectively.

11. The aircraft turbofan gas turbine engine as claimed in claim 10, further comprising:
the retarding and advancing passage discharge sections including annular axially spaced apart retarding and advancing discharge grooves respectively extending into the fan drive shaft and covered by an aft end of the fan hub,
the retarding and advancing passage entry sections including annular axially spaced apart retarding and advancing entry grooves respectively extending into the fan drive shaft and covered by a shaft bearing support rotatably supporting the fan drive shaft,
retarding and advancing fluid feed passages extending radially through the shaft bearing support to the retarding and advancing passage entry sections,
one or more oil feed passages extending through the shaft bearing support to the fan drive shaft for lubricating the fan drive shaft, and
retarding and advancing oil lines fluidly connecting the retarding and advancing fluid feed passages to retarding and advancing valves for draining and filling retarding and advancing oil flow in the retarding and advancing chambers respectively.

12. The aircraft turbofan gas turbine engine as claimed in claim 10, further comprising:
a shaft bearing support rotatably supporting the fan drive shaft,
retarding and advancing fluid feed passages extending radially through the shaft bearing support to the retarding and advancing passage entry sections,
one or more oil feed passages extending through the shaft bearing support to the fan drive shaft for lubricating the fan drive shaft, and
retarding and advancing oil lines fluidly connecting the retarding and advancing fluid feed passages to retarding and advancing valves for draining and filling retarding and advancing oil flow in the retarding and advancing chambers respectively.

13. The aircraft turbofan gas turbine engine as claimed in claim 12, further comprising a single solenoid operably connected to the retarding and advancing valves.

14. The aircraft turbofan gas turbine engine as claimed in claim 9, further comprising:
each of the variable pitch fan blades including a fan blade pin or shaft extending radially inwardly from an airfoil and centered and circumscribed about the pitch axis,
the fan blade pin or shaft extending through and rotatable within a blade mounting hole in an annular hub wall of the fan hub,
a sprocket mounted and secured to and around the fan blade pin or shaft inside the fan hub, and
a crown or ring gear engaging each of the sprockets.

15. The aircraft turbofan gas turbine engine as claimed in claim 14, further comprising:
the timing pocket walls operable with the timing vanes for varying circumferential area and volume of the variable area and volume retarding and advancing chambers,
the retarding and advancing fluid passages including annular and axially spaced apart retarding and advancing passage discharge sections respectively,
the retarding and advancing fluid passages including annular and axially spaced apart retarding and advancing passage entry sections respectively,
the retarding and advancing passage entry sections axially spaced apart from and aft of the retarding and advancing passage discharge sections respectively, and
retarding and advancing connecting passage sections extending through the fan drive shaft and fluidly connecting the retarding and advancing passage entry sections to the retarding and advancing passage discharge sections respectively.

16. The aircraft turbofan gas turbine engine as claimed in claim 15, further comprising retarding and advancing hub passages extending through the fan hub and fluidly connecting the retarding and advancing passage discharge sections to the retarding and advancing chambers respectively.

17. The aircraft turbofan gas turbine engine as claimed in claim 16, further comprising:
the retarding and advancing passage discharge sections including annular axially spaced apart retarding and advancing discharge grooves respectively extending into the fan drive shaft and covered by an aft end of the fan hub,
the retarding and advancing passage entry sections including annular axially spaced apart retarding and advancing entry grooves respectively extending into the fan drive shaft and covered by a shaft bearing support rotatably supporting the fan drive shaft,
retarding and advancing fluid feed passages extending radially through the shaft bearing support to the retarding and advancing passage entry sections,
one or more oil feed passages extending through the shaft bearing support to the fan drive shaft for lubricating the fan drive shaft, and retarding and advancing oil lines fluidly connecting the retarding and advancing fluid feed passages to retarding and advancing valves for draining and filling retarding and advancing oil flow in the retarding and advancing chambers respectively.

18. The aircraft turbofan gas turbine engine as claimed in claim 15, further comprising:
a shaft bearing support rotatably supporting the fan drive shaft,
retarding and advancing fluid feed passages extending radially through the shaft bearing support to the retarding and advancing passage entry sections,
one or more oil feed passages extending through the shaft bearing support to the fan drive shaft for lubricating the fan drive shaft, and
retarding and advancing oil lines fluidly connecting the retarding and advancing fluid feed passages to retarding and advancing valves for draining and filling retarding and advancing oil flow in the retarding and advancing chambers respectively.

19. The aircraft turbofan gas turbine engine as claimed in claim 17, further comprising a single solenoid operably connected to the retarding and advancing valves.

\* \* \* \* \*